Jan. 29, 1935. G. D. McDONALD 1,989,329
FIXTURE ACCESSORY
Filed Feb. 12, 1934

INVENTOR
GEORGE D. McDONALD
BY Ernest L. Wallace
ATTORNEY

Patented Jan. 29, 1935

1,989,329

UNITED STATES PATENT OFFICE 1,989,329

FIXTURE ACCESSORY

George D. McDonald, Los Angeles, Calif.

Application February 12, 1934, Serial No. 710,960

2 Claims. (Cl. 248—20)

This invention relates to a fixture adapted to be secured to a support, such as a wall. It contemplates a fixture in which the attaching means is concealed from view. Such types of fixtures are commonly used as bathroom accessories, although it will be apparent that the field of use is more extensive. As a bathroom fixture, it may be incorporated in towel racks, soap holders, tumbler holders, toothbrush holders and utility hooks. The specific embodiment of the invention illustrated and described herein is a utility hook.

Such fixtures, obviously should be attractive in appearance, easily installed, strong, durable and comprise a minimum of parts. It is an object of this invention to provide a fixture meeting the aforementioned requirements.

Figure 1:
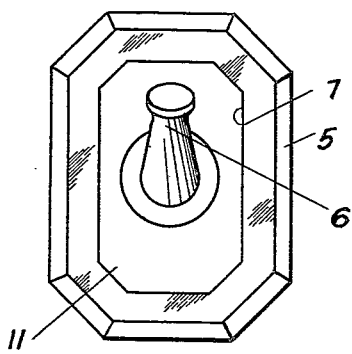
Figure 2:
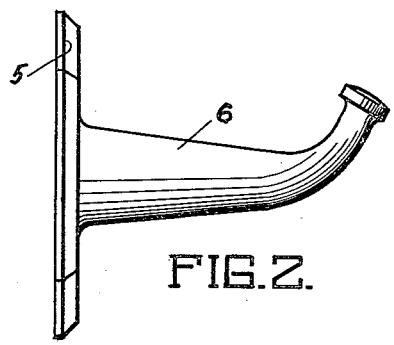
Figure 3:
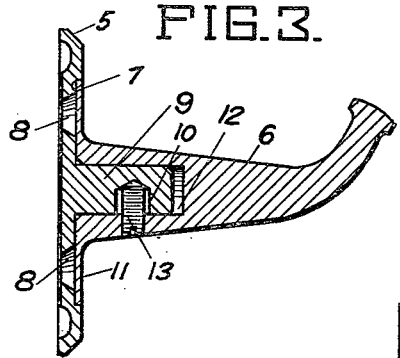
Figure 4:
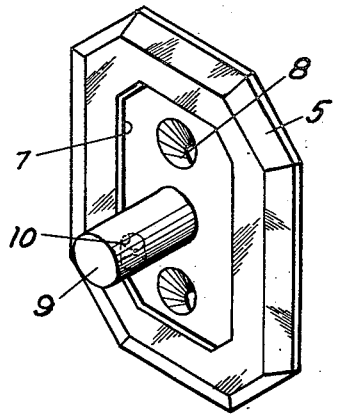

These objects together with details of structure and corresponding accomplishments are obtained by means of the embodiment of my invention illustrated in the accompanying drawing, in which:

Fig. 1 is a front elevational view of a utility hook fixture; Fig. 2 is a side elevational view; Fig. 3 is a longitudinal sectional view; and Fig. 4 is a perspective view of the base plate.

Referring more particularly to the drawing, the fixture comprises a base plate 5 and holder 6. The base plate is shown of octagonal form having bevelled marginal edges. The particular fixture shown is adapted to be constructed of metal and if desired suitably plated. An inset recess 7 of panel form is provided in the plate. This recess is preferably of a shape corresponding to the base plate. As shown, the base plate has screw holes 8 whereby it may be attached to a wall. It will be understood that other means of attachment may be provided such as a projection on the back of the plate for setting in cement, these being common expedients resorted to in installation of such fixtures. Outstanding from the center of the base is a post or stem 9 which is shown formed integral therewith. A socket 10 is provided in the stem for receiving a set screw.

The holder 6 comprises a panel 11 which is of the same size as the recess 7 and is adapted to be set therein. The panel is preferably of the same thickness as the depth of the recess so that when the holder and base are assembled, the outer faces of the base plate and panel will be flush. The holder is provided with a socket 12 to snugly receive the stem 10. A threaded hole is provided in the holder for receiving a set screw 13 which rests in the socket 10.

The base plate is fixed to its support. Then the holder is slipped over the stem with the panel 11 inserted in recess 7. The set screw is then inserted as shown in Fig. 3, securely locking the parts together. Due to the fact that the panel 11 has flat sides abutting the walls of recess 7 the hook is sustained against turning and the set screw relieved of such strain. Due to the fact that the panel is flush with the outer face of the base plate, the appearance is that of a single panelled fixture. It is apparent that the base plate 5 may be interchangeable with other holders or hooks. It will also be apparent that the invention is not limited to the particular shape of base plate or panel shown herein and may be varied as found advisable and desirable.

What I claim is:

1. A fixture device comprising a base plate adapted to be attached to a support, said base plate having a panel recess, a stem outstanding from said base plate from a position within the marginal edges of said recess, a holder member having a panel conforming in shape to said recess for seating therein, said holder having a socket to snugly receive said stem, said panel and recess having confronting side wall portions which are non-concentric to said stem whereby to prevent rotation of said panel with respect to said base plate, means to lock said plate and holder together, against longitudinal displacement with said panel merging with said plate to simulate an integral member.

2. A fixture device comprising a base plate adapted to be attached to a support, said base plate having a panel recess, a panel agreeing in configuration with said panel recess, and adapted to seat singly therein a holder carried by the panel and projecting outwardly therefrom, said panel and recess having confronting side wall portions which are non-concentric to the longitudinal axis of the holder, and means to secure the panel in a seated position within the recess of the base plate.

GEORGE D. McDONALD.